Nov. 20, 1923.
B. P. GRAVES
1,474,525
ADJUSTABLE SUPPORT FOR WORKHOLDERS
Filed Aug. 6, 1921    2 Sheets-Sheet 2
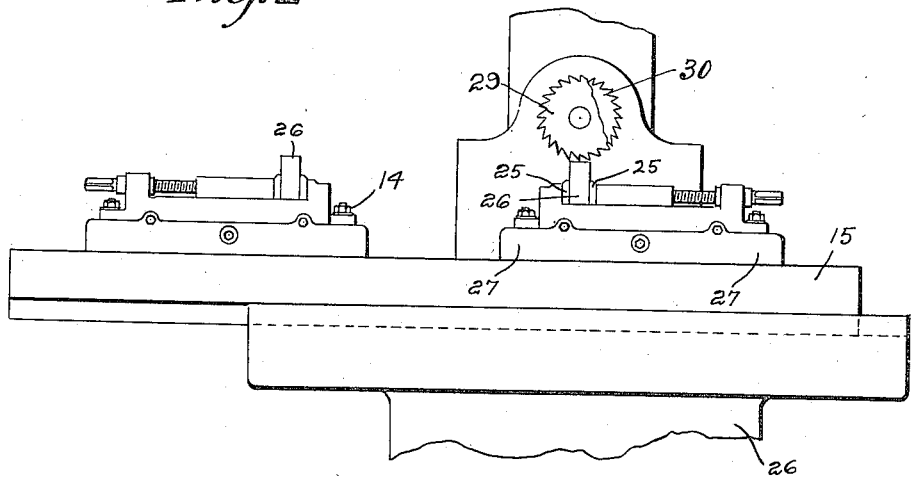
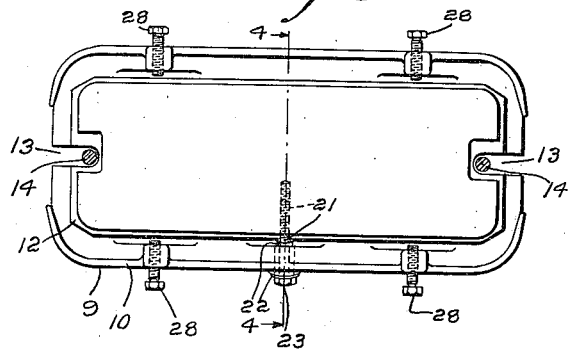
Inventor
Benjamin P. Graves
By Howard E. Barlow
Attorney Patented Nov. 20, 1923.

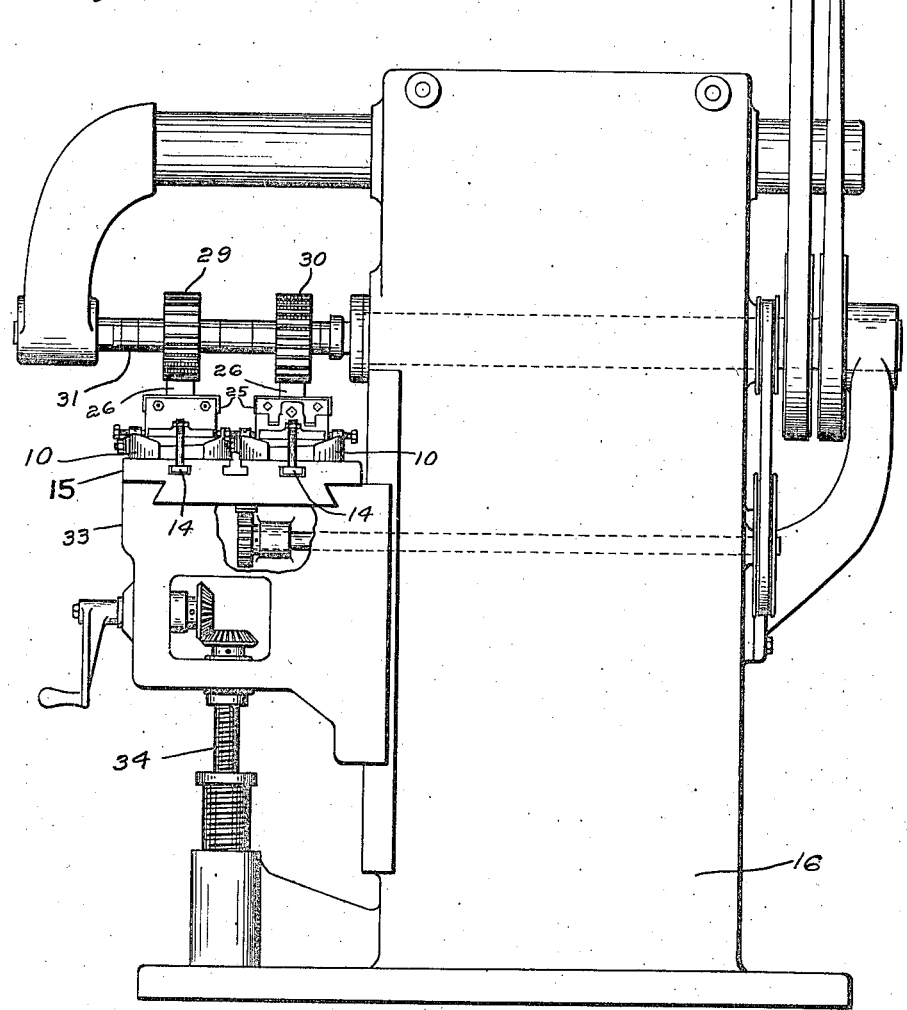

1,474,525

UNITED STATES PATENT OFFICE.

BENJAMIN P. GRAVES, OF PROVIDENCE, RHODE ISLAND, ASSIGNOR TO BROWN & SHARPE MFG. CO., OF PROVIDENCE, RHODE ISLAND, A CORPORATION OF RHODE ISLAND.

ADJUSTABLE SUPPORT FOR WORKHOLDERS.

Application filed August 6, 1921. Serial No. 490,375.

*To all whom it may concern:*

Be it known that I, BENJAMIN P. GRAVES, a citizen of the United States, residing at Providence, in the county of Providence and State of Rhode Island, have invented certain new and useful Improvements in Adjustable Supports for Workholders, of which the following is a specification.

This invention relates to an adjustable support for a work-holding device; and has for its object to provide simple and effective means whereby a plurality of pieces of work may be supported independent of each other to be presented to the same or different operating tools, means being provided in the individual supports for adjusting one independently of the other relative to the operating tool.

A further object of this invention is to provide an adjustable support or base for a work holder which may be in the form of a vise, and to provide an adjustable wedge in this base whereby the vise may be adjusted vertically in its base.

A still further object of the invention is to provide simple and effective means in the base whereby the vise or holder may also be adjusted laterally in its base when desired to facilitate aligning the work with the cutter.

With these and other objects in view, the invention consists of certain novel features of construction, as will be more fully described, and particularly pointed out in the appended claims.

In the accompanying drawings:—

Figure 1 is a side elevation of a milling machine showing a pair of my improved adjustable work holders as mounted to each present its piece of work to its individual cutter.

Figure 2 is a front elevation showing a pair of my improved adjustable work holders, one at either end of the work carriage of a milling machine whereby the work in one may be removed and fresh work inserted therein while a cutter is operating upon the work in the other holder.

Figure 3 is a top view of the base member for the work holder showing the laterally adjustable wedge-shaped plate mounted therein.

Figure 4 is an end sectional elevation on line 4—4 of Figure 3.

Figure 5 is a detail showing the wedge plate which is movably mounted in the base portion.

In some cases, for example where it is desired to operate upon a multiplicity of duplicate pieces of work successively in a milling machine, a pair of spaced apart cutters are sometimes mounted to work on a single spindle, and two different pieces of the work are supported in independent holders whereby the work in one holder may be operated upon at the same time the work in the other holder is being removed and replaced by fresh work, and by the time the cutter has finished operating upon one, the other is ready to be advanced to be operated by its cutter.

By the old method both of the cutters used on this particular kind of work were necessarily of the same diameter and if one required sharpening it was necessary to also grind the other whether it needed it or not and grind it to exactly the same diameter in order to take the same cut on the two different pieces of work to produce exact duplicate pieces.

To obviate this difficulty I have provided simple and effective means whereby either one or both of the individual work holders may be adjusted independently of the other and relative to its cutter, so that each cutter may be sharpened when required independent of the other and their diameters varied if desired and still be able to produce duplicate work. This device being more particularly adapted for use on a machine such as that described in our prior Patent No. 1,355,167, patented October 12, 1920, and the following is a detailed description of one means by which this result may be accomplished:—

With reference to the drawings, 9 designates the base member of the holder which is formed with an outer flange 10 in which is a bed portion 12 set on an incline, as best illustrated in Figure 4. This frame is slotted on its ends at 13 to receive the clamping bolts 14 by which the work-holder presently described, and the base may be secured to the vertically adjustable carriage or table 15 of the milling machine 16 or other similar machine.

This inclined bed 12 is slotted transversely as at 17 and on it I have mounted a wedge plate 18 which is provided on its lower face with a key or rib 19 which sets into the transverse groove 17 in the bed, to hold the plate in alinement therein as it is adjusted transversely thereon.

In order to provide an adjustment of this wedge plate I have threaded a hole 20 in one edge thereof and in this hole I have mounted a screw 21, its outer end extending through the frame or flange 10 of the base and is provided with suitable bearing collars 22 on either side thereof whereby the rotating of this screw by its head 23 causes the plate to move laterally in the bed to raise and lower its supporting surface therein and, when the screws 28 are untightened or properly adjusted, will laterally shift the work-holder 24 thereon.

On this wedge plate I may set any suitable workholder 24, but the same is particularly designed to receive a work-holding vise, between the jaws 25 of which the work 26 to be operated upon may be secured. This vise is provided with ears 27 at either end thereof through which the usual T-head clamp-bolts 14 are passed to secure the vise and its base to the carriage or table 15 of the machine on which it is mounted.

In some instances it is found to be desirable to adjust the vise and its work laterally independently of the movement of its supporting base 9 or of the wedge plate 24. To accomplish this I have provided a set of screws 28 threaded through the frame or flanges 10 to engage the vise on opposite sides and at its opposite ends, whereby by adjusting these screws the vise may be caused to align the work laterally relative to the cutter independent of the adjustment of the base, which vise adjustment may be obtained by simply loosening the end clamp bolts 14 and adjusting the screws 28.

In applying my improved work-holding and adjusting units to the carriage of a milling machine, in some classes of work, I secure one holder near one end of the carriage and the other near the opposite end thereof as illustrated in Figure 2, the holders being set out of longitudinal alignment with each other and in position to present their work alternately to the different cutters 29 and 30 which are mounted on the arbor 31, whereby while the cutter 29 is operating upon the work in one of the holders the other holder is out in position where its work may be replaced by fresh work ready to be moved up to its cutter as soon as the work being operated upon has been finished.

In starting the holding units are mounted upon the table 15, which is reciprocated on its frame 33, the latter being vertically adjustable by the hand-operated screw 34, and the table, through this screw, is raised to bring one of the pieces of work to exactly the right height to be operated upon by its cutter, then the other holder is adjusted, if necessary, to properly present its work to its cutter. In this way it will be seen that by my improved construction of adjustable work holders that the work in each may be adjusted independently of that of the other relative to its particular cutter and independently of the table 32 and no time need be lost in trying to keep the cutters of equal diameter in order to produce duplicate pieces of work in the different holders.

The foregoing description is directed solely towards the construction illustrated, but I reserve the privilege of resorting to all the mechanical changes to which the device is susceptible, the invention being defined and limited only by the terms of the appended claims.

I claim:

1. An adjustable support for a work-holding device comprising a base adapted to be secured on the work-table of a machine, an adjustable wedge in said base having an inclined face to extend parallel to the axis of the tool of the machine, a work-holder mounted on said wedge in said base; and means for moving said wedge to laterally and vertically adjust said work-holder.

2. An adjustable work-support having in combination a base, a wedge plate mounted in said base, a work-holding vise having a pair of screw operated clamping jaws supported on said wedge, adjustable elements on opposite sides of said base plate, engageable with said work-holding vise, means for moving said wedge to secure a vertical adjustment of said vise in said base, and means for securing said base, plate and vise together and to the work-table of a machine.

3. A device of the character described having in combination a base, a wedge plate mounted in said base, a work holding vise supported on said wedge, means for moving said wedge for securing a vertical adjustment of said vise, means in said base for securing relative lateral adjustment of said vise relative to said wedge plate, and binding elements extending from the vise through the base for removably securing both said base and vise together and to the machine.

4. The vise of the character described comprising a base having an inclined top surface, a plate mounted on the top of said base and having a correspondingly inclined surface on its bottom face, a work holder mounted on said plate and having work gripping means thereon, means for moving said plate relative to said base, whereby the work holder is vertically and laterally adjusted, an adjustable means on said base for shifting said work holder laterally relatively to said plate independently of the adjustment of said plate.

5. A vise, as set forth in claim 4, further characterized by said adjustable means being adapted to secure said work holder in its adjusted positions.

6. The vise of the character described comprising a base having an inclined top surface, a plate mounted on the top of said base and having a correspondingly inclined surface on its bottom face, a work holder mounted on said plate and having work gripping means thereon, means for moving said plate relative to said base, whereby the work holder is vertically and laterally adjusted, upwardly extending flanges on said base plate, binding members threadedly adjustable in said flanges to engage said work holder for securing it in adjusted positions and for laterally adjusting said work holder relatively and independently of said plate.

In testimony whereof I affix my signature.

BENJAMIN P. GRAVES.